US012077366B2

(12) United States Patent
MacVittie et al.

(10) Patent No.: US 12,077,366 B2
(45) Date of Patent: Sep. 3, 2024

(54) INTELLIGENT MEDICINE DISPENSER

(71) Applicant: RxCap, Inc., Washington, DC (US)

(72) Inventors: David MacVittie, Washington, DC (US); Hale Kpetigo, Bethesda, MD (US); Michael A. Furlotti, San Francisco, CA (US)

(73) Assignee: RxCap, Inc., Lynnfield, MA (US)

( * ) Notice: Subject to any disclaimer, the term of this patent is extended or adjusted under 35 U.S.C. 154(b) by 0 days.

(21) Appl. No.: 16/901,867

(22) Filed: Jun. 15, 2020

(65) Prior Publication Data

US 2020/0307897 A1 Oct. 1, 2020

Related U.S. Application Data

(63) Continuation of application No. 14/516,093, filed on Oct. 16, 2014, now Pat. No. 10,730,687.

(51) Int. Cl.
*B65D 83/04* (2006.01)
*A61J 7/04* (2006.01)

(52) U.S. Cl.
CPC ........ *B65D 83/0454* (2013.01); *A61J 7/0472* (2013.01); *A61J 7/049* (2015.05); *A61J 2200/30* (2013.01)

(58) Field of Classification Search
CPC ...... B65D 35/38; B65D 83/0454; A61J 7/049; A61J 7/0472; A61J 2/20; A61J 2200/30
USPC ........ 221/7, 18, 197, 124, 13, 86, 25, 26, 3, 221/15, 76; 220/820; 206/528; 364/479
See application file for complete search history.

(56) References Cited

U.S. PATENT DOCUMENTS

| | | | | | |
|---|---|---|---|---|---|
| 4,494,329 | A * | 1/1985 | Post | F41A 9/53 | 42/1.05 |
| 4,572,403 | A * | 2/1986 | Benaroya | A61J 7/04 | 221/76 |
| 4,725,997 | A * | 2/1988 | Urquhart | A61J 7/0076 | 368/10 |
| 4,785,969 | A * | 11/1988 | McLaughlin | G16H 20/13 | 221/83 |
| 4,811,764 | A * | 3/1989 | McLaughlin | A61J 7/0084 | 141/105 |
| 4,980,292 | A * | 12/1990 | Elbert | G01N 35/0092 | 422/65 |
| 5,014,875 | A * | 5/1991 | McLaughlin | G07F 17/0092 | 312/215 |

(Continued)

*Primary Examiner* — Rakesh Kumar
(74) *Attorney, Agent, or Firm* — Venable LLP

(57) ABSTRACT

An article dispensing apparatus includes a carousel and an upper casing with a dispensing face including a dispensing orifice through which the articles are dispensed. The carousel includes plural holding sections for holding the articles to be dispensed and is rotationally movable. A controller controls application of a force to cause the carousel to rotate relative to the dispensing face when an instruction to dispense an article is received. When the carousel is moved so that one of its holding sections having an article therein is aligned with the dispensing orifice, the article is allowed to be dispensed therethrough. A locking mechanism selectively engages the carousel to prevent any relative movement of the carousel when the article dispensing unit is not mounted on the main housing and disengages from the carousel to allow intended relative movement when the article dispensing unit is mounted on the main housing.

20 Claims, 13 Drawing Sheets

(56) References Cited

U.S. PATENT DOCUMENTS

| | | | | | |
|---|---|---|---|---|---|
| 5,170,380 | A * | 12/1992 | Howard | A61J 7/0472 | 368/10 |
| 5,176,285 | A * | 1/1993 | Shaw | A61J 7/0084 | 221/113 |
| 5,230,440 | A | 7/1993 | Kurokawa | | |
| 5,284,133 | A * | 2/1994 | Burns | A61M 15/0066 | 128/203.14 |
| 5,303,214 | A * | 4/1994 | Kulakowski | G11B 17/225 | |
| 5,472,113 | A * | 12/1995 | Shaw | A61J 7/0084 | 221/15 |
| 5,654,788 | A * | 8/1997 | Kuhn, Jr. | G03B 17/30 | 396/515 |
| 5,755,357 | A * | 5/1998 | Orkin | A61J 7/0084 | 221/121 |
| 5,809,997 | A * | 9/1998 | Wolf | A61M 15/0005 | 128/200.23 |
| 5,931,302 | A * | 8/1999 | Isaacs | B65D 83/0409 | 206/538 |
| 6,004,020 | A * | 12/1999 | Bartur | G07F 9/002 | 700/242 |
| 6,038,099 | A * | 3/2000 | Heinze | G11B 15/6751 | 360/92.1 |
| 6,202,006 | B1 * | 3/2001 | Scott | G07D 1/02 | 700/231 |
| 6,206,235 | B1 * | 3/2001 | Green | B65D 83/0409 | 221/293 |
| 6,728,076 | B1 * | 4/2004 | Ko | G11B 23/0317 | |
| 6,997,344 | B2 * | 2/2006 | Brown | G07F 11/54 | 221/25 |
| 7,249,687 | B2 * | 7/2007 | Anderson | A61M 15/0043 | 221/3 |
| 7,480,923 | B2 * | 1/2009 | Aaron | G11B 15/68 | |
| 7,533,785 | B2 * | 5/2009 | Smith | B65D 83/0409 | 221/268 |
| 7,896,192 | B2 * | 3/2011 | Conley | G07F 17/0092 | 221/92 |
| 7,913,838 | B2 * | 3/2011 | Zhong | G01N 33/48778 | 600/583 |
| 8,064,062 | B2 * | 11/2011 | Ogawa | G01N 21/253 | 356/432 |
| 8,102,735 | B2 * | 1/2012 | Morse | G04F 1/005 | 235/375 |
| 8,251,926 | B2 | 8/2012 | Schifman et al. | | |
| 8,308,414 | B2 | 11/2012 | Schifman et al. | | |
| 8,397,946 | B2 | 3/2013 | Portney | | |
| 8,574,510 | B2 * | 11/2013 | Gofman | G01N 27/403 | 221/56 |
| 8,695,469 | B2 | 4/2014 | Webb et al. | | |
| 8,899,706 | B2 | 12/2014 | Yabuki | | |
| 8,924,227 | B2 * | 12/2014 | Fellows | G06Q 20/203 | 705/2 |
| 8,936,175 | B1 * | 1/2015 | Song | A61J 7/0472 | 221/15 |
| 8,944,282 | B2 | 2/2015 | Kroupa et al. | | |
| 8,967,426 | B2 * | 3/2015 | Koike | G07F 9/026 | 221/1 |
| 9,010,571 | B2 | 4/2015 | Bailey | | |
| 9,079,182 | B2 * | 7/2015 | De Gier | B01L 7/52 | |
| 9,504,793 | B2 * | 11/2016 | Eggert | A61M 5/5086 | |
| 9,782,551 | B2 * | 10/2017 | Morrison | G16H 20/13 | |
| 10,369,305 | B2 * | 8/2019 | Li | A61M 15/0045 | |
| 10,445,472 | B2 | 10/2019 | LeBrun | | |
| 10,881,818 | B2 * | 1/2021 | Costella | A61B 5/0876 | |
| 11,419,995 | B2 * | 8/2022 | Milton-Edwards | G16H 20/10 | |
| 2001/0028308 | A1 * | 10/2001 | De La Huerga | A61M 5/14212 | 221/9 |
| 2003/0127463 | A1 * | 7/2003 | Varis | G16H 20/13 | 221/13 |
| 2004/0094564 | A1 | 5/2004 | Papp | | |
| 2004/0104292 | A1 * | 6/2004 | Takahashi | G11B 23/043 | 242/338.1 |
| 2005/0119604 | A1 * | 6/2005 | Bonney | A61M 15/0083 | 604/19 |
| 2005/0177275 | A1 * | 8/2005 | Harvey | A61J 7/0472 | 221/6 |
| 2006/0173576 | A1 * | 8/2006 | Goerg | A47K 10/3662 | 700/236 |
| 2008/0178872 | A1 * | 7/2008 | Genova | A61M 15/0065 | 128/200.23 |
| 2009/0250483 | A1 * | 10/2009 | Lee | B42B 4/00 | 221/13 |
| 2009/0294521 | A1 * | 12/2009 | De La Huerga | A61J 1/035 | 235/375 |
| 2010/0268381 | A1 | 10/2010 | Goerg et al. | | |
| 2012/0003928 | A1 * | 1/2012 | Geboers | G07F 17/0092 | 222/129 |
| 2012/0035760 | A1 * | 2/2012 | Portney | G16H 20/13 | 700/231 |
| 2012/0055472 | A1 * | 3/2012 | Brunnberg | A61M 15/008 | 128/203.12 |
| 2012/0055948 | A1 | 3/2012 | Leifeld et al. | | |
| 2012/0249629 | A1 * | 10/2012 | Yabuki | B41J 2/1752 | 347/6 |
| 2013/0044390 | A1 * | 2/2013 | Minemura | G11B 15/6835 | 360/92.1 |
| 2014/0026416 | A1 * | 1/2014 | Shirono | B41J 2/17553 | 29/890.1 |
| 2014/0097194 | A1 * | 4/2014 | Lai | B65D 83/0454 | 221/13 |
| 2014/0203035 | A1 * | 7/2014 | Giraud | B65D 35/28 | 221/256 |
| 2014/0263425 | A1 | 9/2014 | Akdogan et al. | | |
| 2014/0267719 | A1 * | 9/2014 | Akdogan | B65D 83/0409 | 340/5.52 |
| 2015/0100335 | A1 * | 4/2015 | Englehard | G16H 40/67 | 705/2 |
| 2015/0291344 | A1 * | 10/2015 | MacVittie | A61J 7/0418 | 221/13 |
| 2016/0107820 | A1 * | 4/2016 | MacVittie | B65D 83/0454 | 221/13 |
| 2017/0011873 | A1 * | 1/2017 | Ely | H01H 25/008 | |

* cited by examiner

INTELLIGENT MEDICINE DISPENSER

BACKGROUND OF THE INVENTION

The present invention relates to dispensers configured to dispense articles, particularly medication, to a user, and to devices, methods and systems for controlling medication dispensing and tracking medication compliance.

Medication non-compliance is a major problem in health care. Medications in the form of pills, capsules, gel-caps, pellets, tablets, etc., are typically provided to a user in a disposable plastic container with a cap, such as a childproof cap. When physicians prescribe medications, they typically advise the patients of a proper medication administration, such as to take the medication at appropriate times in appropriate quantities, to continue taking the medication for the full prescribed regimen, even if the patient feels better, etc. Unfortunately, many patients exhibit poor compliance in properly following the regimens set out by their physicians.

A variety of products and techniques for reminding patients to take their medications, as prescribed, are known. Some compliance intervention systems offered by health care providers are designed to remind the patient to take the medication and alert a remote caregiver if the patient does not comply with taking the medication as prescribed. Some of these compliance intervention systems include sensors/reminders in the home, a network connection, and outbound messaging to a caregiver or even back to the patient.

Various attempts have been made to try to increase and improve the compliance of patients in the taking of their medications. Most of these systems are reminder systems. For example, there are a large number of pillbox systems that marry alarm clocks to medication containers to remind patients when it is time to take their medications.

U.S. Patent Application Publication No. 2007/0016443, for example, describes a method of providing a feedback scheme for medication to determine if a patient is complying with a specific schedule for the medication. This is accomplished by applying a special cap to a regular pill container. A sensor senses when the cap is opened and closed. A weight sensor may be provided to determine how many pills have been removed from the container. Further, the patent application publication describes the use of a pillbox with several compartments for storing pills.

U.S. Pat. No. 7,359,765, as another example, describes an electronic pill dispenser which has a container for storing pills with a pill dispensing tray located on the bottom of the container. The container has a pill dispensing mechanism with a rotary wheel connected to two recesses diametrically opposed to each other. The recesses allow the pill to travel through as it is being dispensed. The recesses may be adjustable to dispense a pill of a particular size.

The present invention improves prior systems and overcomes the prior systems' deficiencies.

SUMMARY OF THE INVENTION

A system, method and apparatus are disclosed for an article dispenser which is able to dispense, for example, a single article (or a predetermined number of articles) at a time and determine that the article is being dispensed to the user. Particularly when the article is medication, such as a pill, the system, method and apparatus are also capable of determining the compliance of a user with the prescribed method of consumption of the pill from a doctor or health care provider.

In one aspect of the present invention, a dispensing apparatus includes a main housing having a mounting section; an article dispensing unit mounted in the mounting section of the main housing, the article dispensing unit including a carousel and a stationary casing having a dispensing face including a dispensing orifice through which the articles are dispensed, the carousel including plural holding sections for holding the articles to be dispensed and being rotationally movable relative to the main housing and the dispensing face; and a locking mechanism configured to selectively lock the carousel from movement relative to the dispensing face. The locking mechanism engages the carousel to prevent movement of the carousel relative to the dispensing face when the article dispensing unit is not mounted on the main housing and disengages from the carousel to allow intended relative movement when the article dispensing unit is mounted on the main housing.

In another aspect of the present invention, a dispensing apparatus includes a main housing having a mounting section including a central mounting hub, an actuating unit, and a main controller; and an article dispensing unit mounted in the mounting section of the main housing, the article dispensing unit including a holding unit having plural holding sections for holding articles to be dispensed, a central recess for receiving the mounting hub, a processor configured to communicate with the main controller, and a dispensing orifice through which the articles are dispensed. The actuating unit is configured to manipulate the article dispensing unit to allow one of the articles to be dispensed from the dispensing orifice at a time. The main controller is configured to control the actuating unit to manipulate the dispensing unit to allow the article to be dispensed through the dispensing orifice. The processor communicates with the main processor through communication lines provided in the central mounting hub.

In yet another aspect of the present invention, an article dispensing unit includes a carousel including plural holding sections for holding articles to be dispensed; a stationary casing having a dispensing face including a dispensing orifice through which the articles are dispensed; a connector for securing the carousel to the stationary casing and configured to allow the carousel to be rotationally movable relative to the stationary casing; and a sensor for sensing whether the connector has been released and the carousel has been separated from the stationary casing.

These and other aspects and advantages will become apparent when the description below is read in conjunction with the accompanying drawings.

DETAILED DESCRIPTION OF THE PREFERRED EMBODIMENTS

Figure 1:
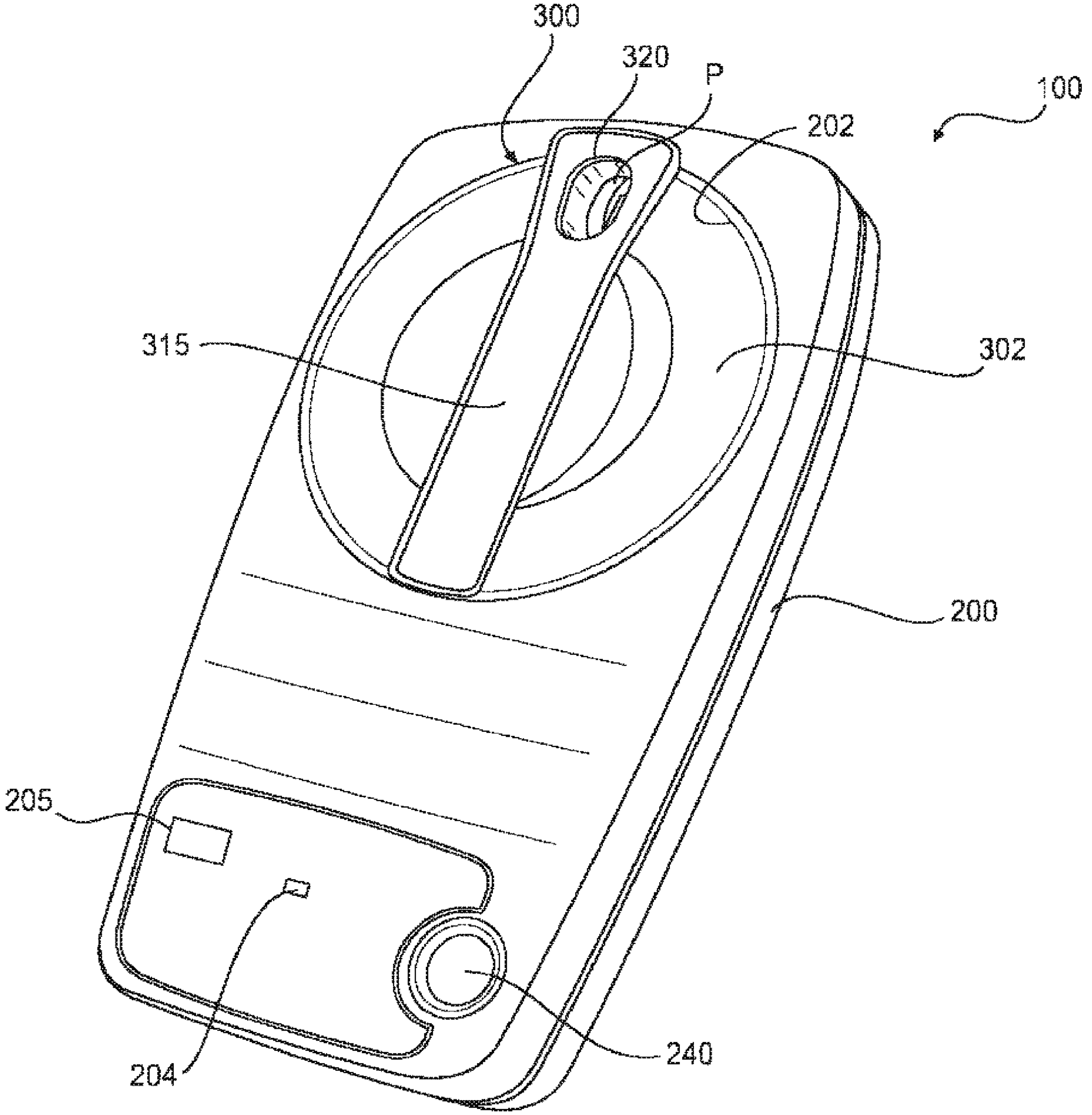
FIG. 1 is a perspective view of a dispenser of a first embodiment of the present invention.
Figure 2:
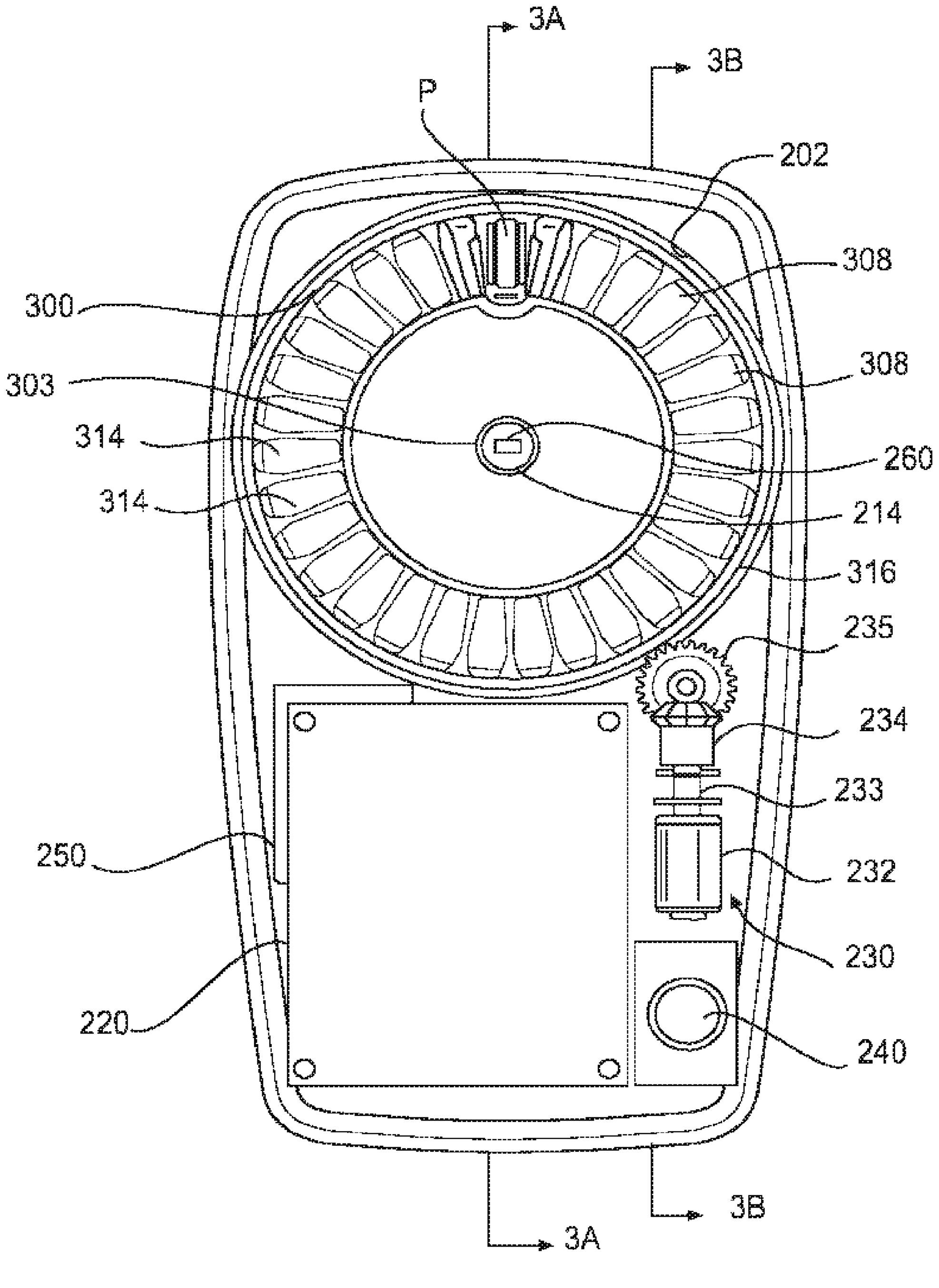
FIG. 2 is a plan view of the internal features of the first embodiment of the present invention.
Figure 3A:
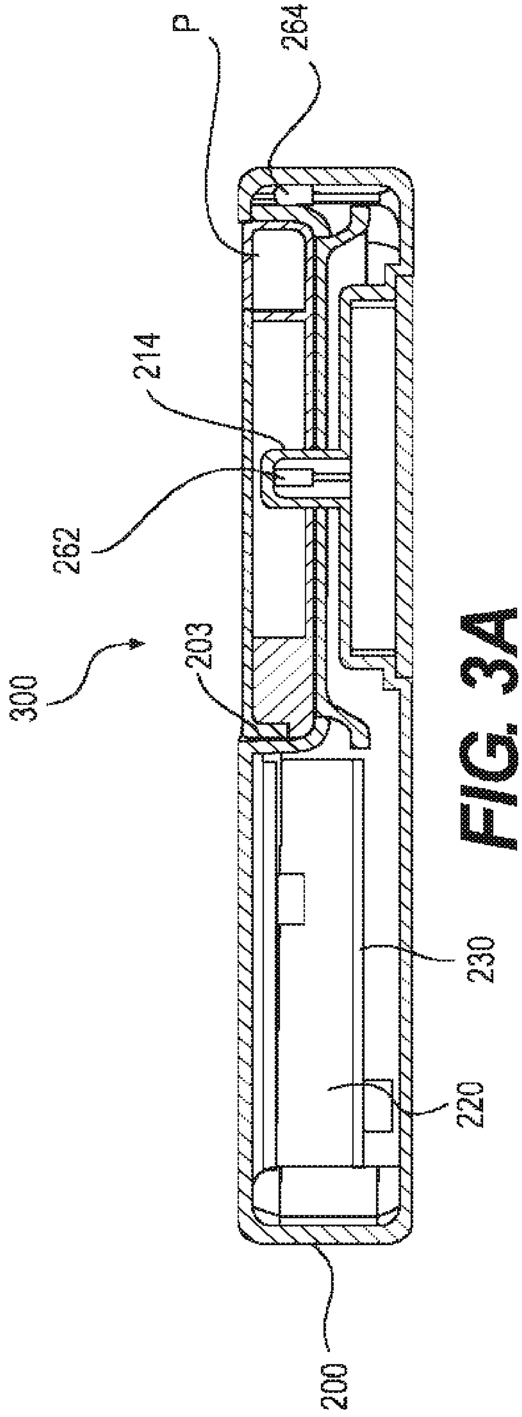
FIGS. 3A and 3B are cross-sectional views of the dispenser of FIG. 2 taken along section lines 3A-3A and 3B-3B, respectively.
Figure 3B:
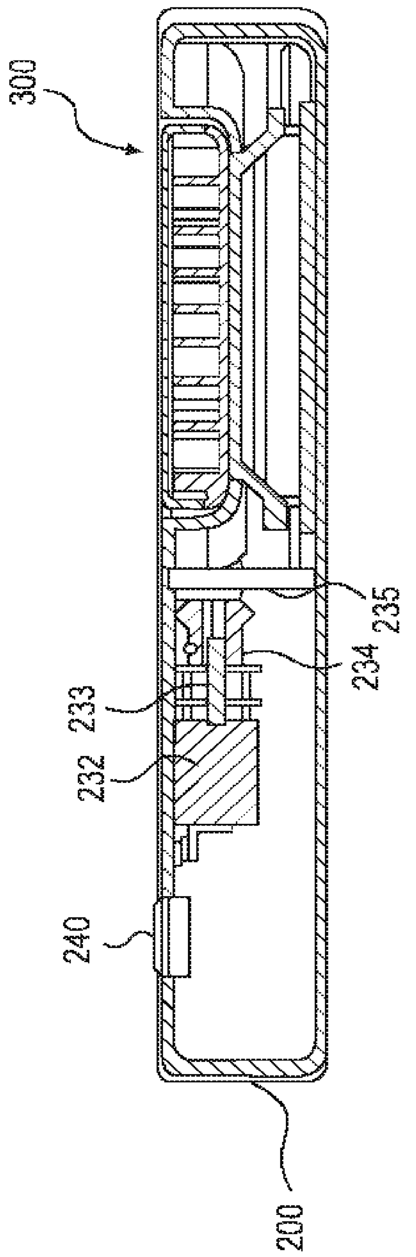

The present invention relates to an apparatus, method and system for using an intelligent dispenser to dispense articles, particularly medicine for a patient, and for monitoring its usage. In a preferred embodiment, the dispensed medicine is in the form of pills. The term "pills," as used herein, refers to any of capsules, gel-caps, pellets, tablets, or the like, in any particular shape or size. However, as would be understood by one of ordinary skill in the art, the present invention is not limited to only dispensing medicine, but may be used to dispense any suitable items, especially those in which compliance is monitored and those of a specific, uniform size.

In a preferred embodiment, as shown in FIGS. 1-3B, a dispensing apparatus or dispenser 100 is a device which distributes appropriate articles to a user. Hereinafter, the example of the articles being medicinal pills P will be used throughout the description, but the present invention is not limited to that example. The dispenser 100 includes a main body or housing 200 and a dispensing cartridge 300. In a preferred embodiment, dispensing cartridge 300 is removably mountable into a mounting recess 202 of main body 200. Recess 202 is shaped to be complementary to the shape of cartridge 300 with peripheral walls 203 and central shaft 214. In a preferred embodiment, both cartridge 300 and recess 202 are of a generally circular shape. Any suitable mechanisms can be used to secure cartridge 300 to main housing 200, such as spring-loaded latches or ball bearings, friction fitting, a bayonet connection, etc. Cartridge 300 is configured to hold a plurality of pills to be dispensed therefrom. Main body 200 is provided with components configured to manipulate cartridge 300 in order to dispense the articles.

In addition to mounting recess 202, main housing 200 includes a control section or controller 220, an actuator mechanism 230, an actuator switch or button 240, a power source 250, and a pill sensing device or sensor 260. Controller 220 is in the form of a printed circuit board (PCB) appropriately programmed to operate the dispensing apparatus. The controller is powered by power source 250, which is preferably in the form of a battery, which can be positioned beneath the PCB for space saving. Actuator 230 includes a rotary DC motor 232 having an output shaft 233, which engages with a transmission including, for example, gears 234, 235. Motor 232 is also powered by power source 250 and controlled by controller 220. Gear 235 engages with a complementary gear 316 provided on dispensing cartridge 300. When motor 232 is actuated to drive transmission gears 234, 235, dispensing cartridge 300 is also consequently actuated.

Figure 4:
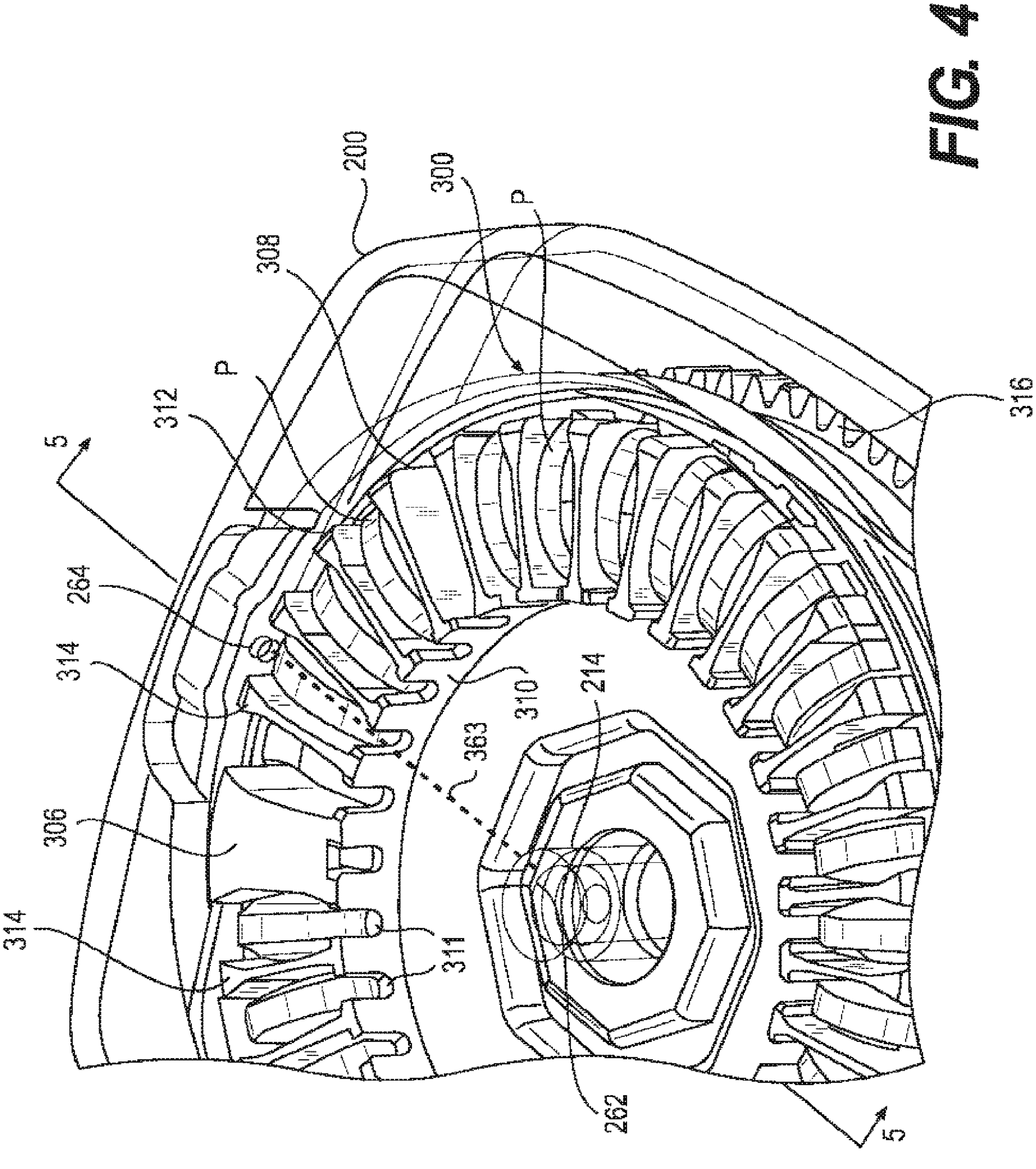
FIG. 4 is an enlarged perspective view of a portion of the mounted cartridge of the present invention.
Figure 5:
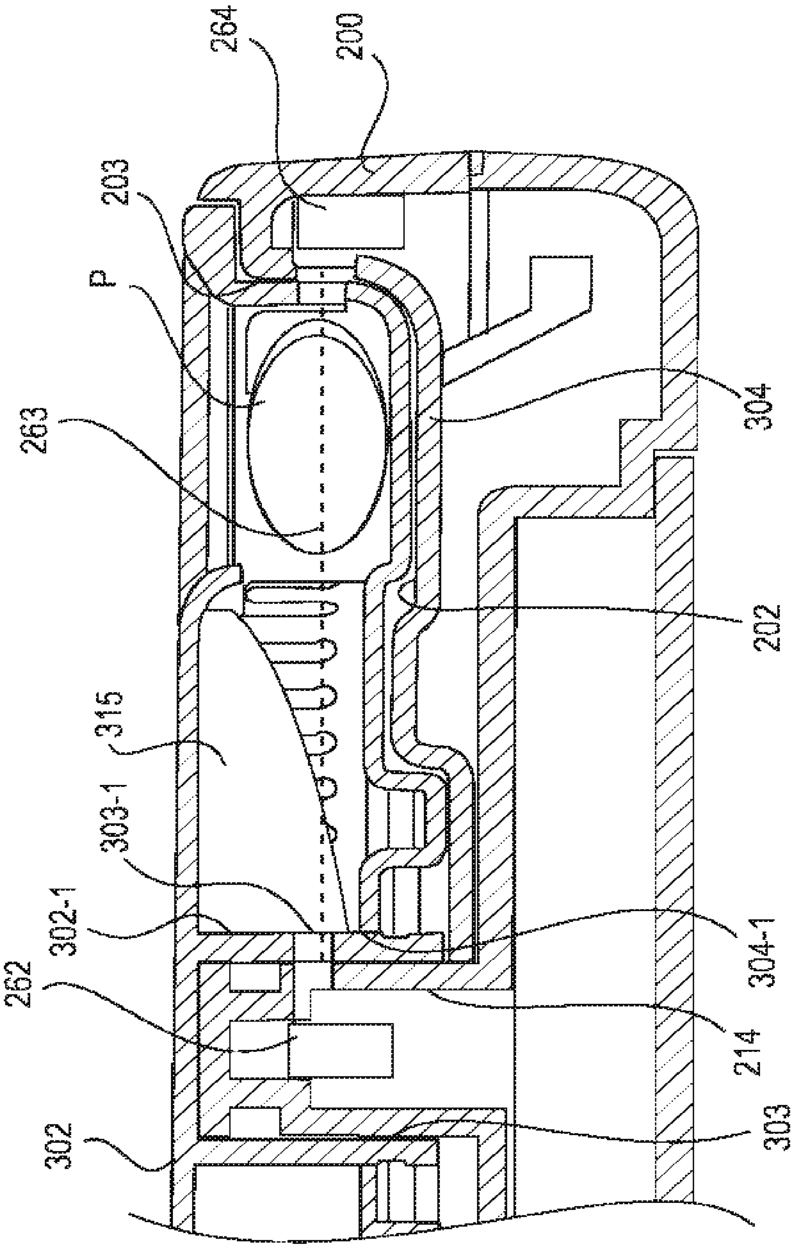
FIG. 5 is a sectional view of the cartridge and main housing along section line 5-5 of FIG. 4.

Dispensing cartridge 300, as shown in FIGS. 1, 4 and 5, includes a stationary upper panel 302, a stationary lower panel 304, and a carousel 306 disposed between the upper and lower panels. Upper panel 302 is provided with a dispensing orifice 320 and a handle or grip 315. Carousel 306 is rotatably secured to the upper and lower panels 302, 304 by any suitable means, such that the carousel can rotate relative to the two panels. For example, upper panel 302 includes a hollow center shaft 302-1 that engages a central hole of carousel 306, such that the edges of the central hole of the carousel engage the peripheral sides of center shaft 302-1 to allow the carousel to rotate therearound. Lower panel 304 is provided with a central hole 304-1 that receives central shaft 302-1 of upper panel 302. Carousel 306 is thereby sandwiched between upper and lower panels 302, 304, but with enough clearance to allow relative rotational movement. Upper and lower panels 302, 304 can be secured to one another by any suitable means. For example, shaft 302-1 of upper panel 302 can create a friction fit when inserted within central hole 304-1 of lower panel 304. The outer peripheral edges of upper and lower panel 302, 304 can frictionally engage to secure the two panels together. As another example, shaft 302-1 can be threaded to engage with complementary threads on central hole 304-1 for securing by threaded engagement. Alternatively or in addition, the outer peripheral edges of upper and lower panel 302, 304 can be threaded to secure the two panels together. Shaft 302-1 and hole 304-1 combine to form hollow central hub 303 of cartridge 300.

Carousel 306 is further provided with a plurality of radial slots 308 for receiving the pills. The slots 308 are defined by an inner peripheral wall 310, an outer peripheral wall 312, and a series of radial separating walls 314. The separating walls can have a symmetrical and contoured shape to approximate the shape of the pill. For example, if the article is an oblong pill with both flat and rounded peripheries, the separating walls can be of a curved shape generally complementary to the curved surface of the pill. In this way, if the separating walls are sized properly, they will hold the pills in a desired orientation with little play. For example, the play can be no more than a few rotational degrees so that the pill cannot rotate completely off of its flat periphery onto its rounded periphery when held in the slots.

Carousel 306 is provided with a rotation gear 316 for engaging with transmission gear 235 of actuator mechanism 230. When driven, carousel 306 moves relative to upper and lower panels 302, 304.

Cartridge 300 is also provided with a preferably rewritable memory, such as an EEPROM 350 for storing data. The memory can be read and/or written by a suitable device at a filling pharmacy and or by controller 220 of main housing 200. The location of the cartridge memory is not limited, but is preferably at a location that can engage with a reader/writer 408 on the main housing 200 that is in communication with controller 220. For example, the cartridge memory 350 can be located on the bottom face of lower panel 304 and the reader/writer 408 can be positioned on a lower face of mounting recess 202.

At least one of stationary upper panel 302 and stationary lower panel 304 of dispensing cartridge 300 can be formed of a translucent material. This will allow a user or a provider to determine whether the cartridge is full, empty, or partially-used. Dispensing cartridge 300 can be formed of molded plastic or any other suitable materials.

Upper panel 302 is formed with a dispensing orifice 320 at a radial position. Orifice 320 is stationary, but carousel 306 can be rotated to align any of its slots with orifice 320. When a slot containing a pill is rotated to align with dispensing orifice 320, that pill is then exposed and can be removed from the dispenser. In one embodiment, dispenser 100 can be tipped to allow the pill to fall out of the orifice into a user's hand, for example. Orifice 320 must be of a size to allow passage of the pill therethrough. In that regard, orifice 320 can be designed to have a shape similar to that of each of the slots.

The pill dispenser 100 may be any desired shape and size. Preferably, the pill dispenser is of a rectangular shape approximately 5" to 6" long, 3" to 4" wide, and less than an inch deep, basically not much larger than a typical smart phone. This allows the pill dispenser 100 to be of a size and shape to be portable and unobtrusive. Structural materials of the dispenser can be of any known type, but plastics may be preferred for ease of manufacture and lower costs than other materials.

An actuating button 240, in communication with controller 220, is located on a face of main body 202. When the button 240 is depressed by a user, the pill dispenser 100 dispenses a pill, as will be discussed further below.

The main body 202 may also have one or more LEDs 204 placed thereon, as shown in FIG. 1. The LEDs may be illuminated in order to alert a user when it is time to take his or her medication, as will be discussed more fully below. As would be understood by one having ordinary skill in the art, multiple color LEDs may be used. Further, the location of the LEDs is not limited to any particular face of main body 202. The LEDs may be placed at any location in order to alert a user.

Dispenser 100 can also be provided with an LCD display 205 in addition to, or in place of, the LEDs. LCD display 205 can be positioned on a face of the main housing, for example, adjacent to the LEDs. The LCD display can perform many functions, such as alerting the user as to when it is time to take his or her medication, indicating the status of the dispenser, outputting an error message, and providing dosage instructions.

Figure 6:
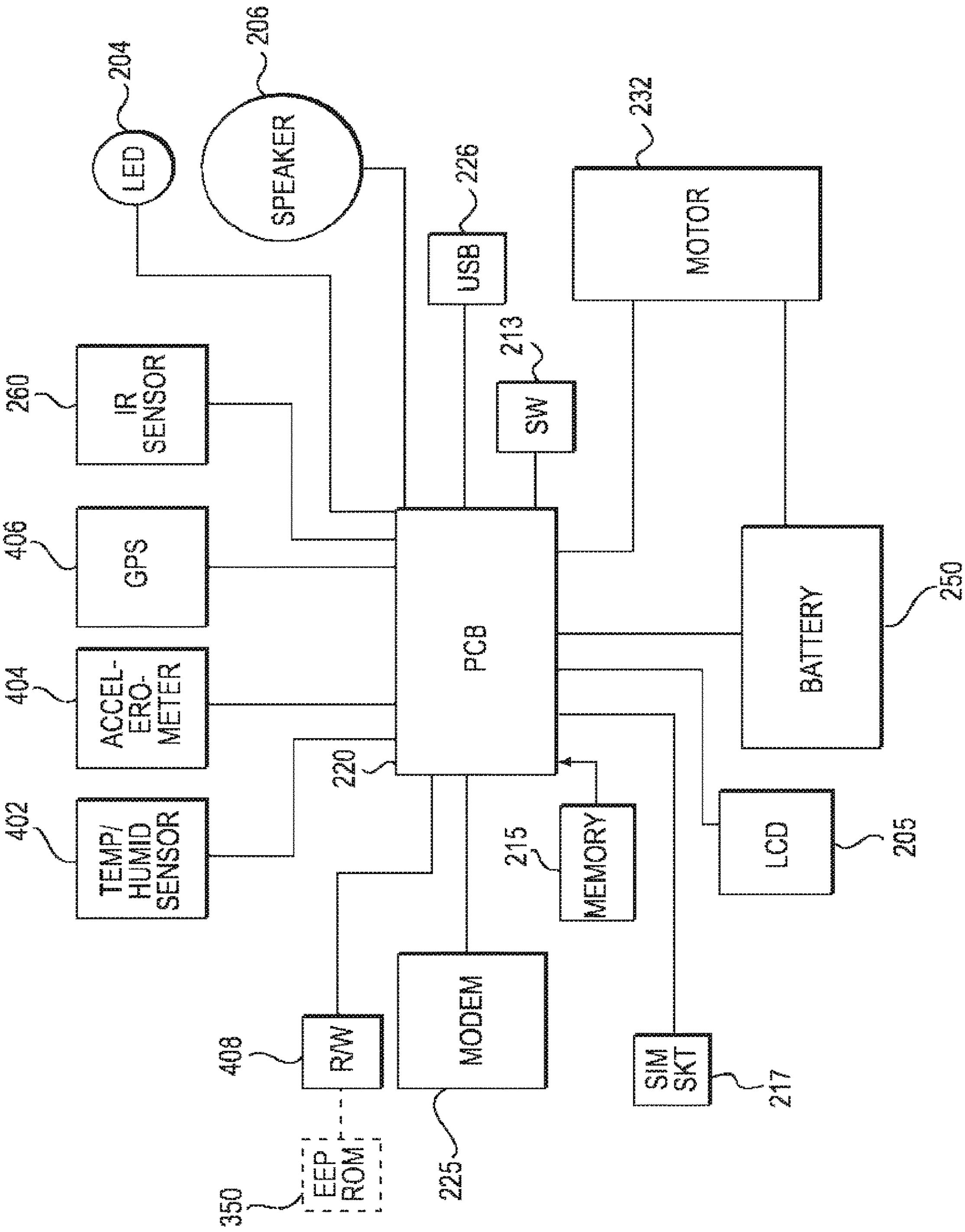
FIG. 6 is a block diagram showing electrical components of an embodiment of the present invention.

FIG. 6 is a schematic diagram of the electrical components of the system. As discussed previously, the controller 220 of the dispenser can be in the form of a PCB, which receives and transmits signals from and to the several electrical components of the dispenser. Controller 220 is provided with any suitable memory that it can use as a workspace and to store and retrieve data and programs.

The dispenser is provided with a temperature and/or humidity sensor 402, an accelerometer 404, and a global positioning system (GPS) unit 406 in communication with controller 220. These sensors can be of any configuration known to those in the art. The temperature and/or humidity sensor 402 can sense ambient temperature and/or humidity conditions of the dispenser and can convert those conditions into an electrical signal to supply to controller 220. Controller 220 is programmed to control the dispensing operation depending on current or recent temperature and/or humidity conditions. For example, if the temperature or humidity detected by sensor 402 is above a threshold level stored in memory 215, controller 220 does not allow motor 232 to operate to rotate the dispensing cartridge, even if a user has depressed the dispensing button 240. This is because certain medications may not be usable if exposed to extreme temperature and humidity conditions. If the ambient conditions potentially render the medication unusable, this feature can prevent the user from using unsafe or ineffective medication. A message indicating that the unit has been in undesirable temperature or humidity conditions can be also displayed on LCD 205 to notify the user as to why dispensing is not being permitted.

Accelerometer 404 is incorporated into dispenser 100 and can be used to determine the orientation of the dispenser and its movements. Signals from the accelerometer 404 are fed to the controller 220 for processing. As discussed above, when a pill is to be dispensed, carousel 306 of dispensing cartridge 300 is rotated to expose a pill in dispensing orifice 320. If the dispenser is oriented in an upside down position, for example, when the carousel rotates and the pill is aligned with the dispensing orifice, the pill may freely drop out even if a user is not ready to receive the pill is her or her hand. Controller 220 can be programmed to compare the orientation of the dispenser determined from signals from accelerometer 404 at the time of dispensing with acceptable orientations stored in memory 215. If the determined orientation is within acceptable ranges, dispensing will be permitted. However, if the dispenser is in an unacceptable orientation, such as upside down, the controller will not send a signal to the motor to actuate the carousel even if the dispensing button has been depressed. The controller can be programmed to effect the dispensing movement of the carousel once the dispenser is repositioned in an acceptable orientation.

Controller 320 can also process the signals from accelerometer 404 to determine whether the dispenser is moving and at what velocity and acceleration. For example, if the controller determines that the dispenser is moving at gravitational acceleration, it assumes that the dispenser has been dropped and is falling. If the dispensing button has been depressed, and thereafter controller 220 determines that the unit is falling, the controller will not send signals or will interrupt signals that have already been sent to motor 232 to actuate the carousel. This will prevent the pill from being lost if the dispensing operation were to be performed before the dispenser impacts. As an alternative, a locking device (not shown) can be incorporated into the dispenser and be actuated when the controller senses the dispenser is falling, so as to lock movement of the carousel.

GPS unit 406 can be used to track the location of the dispenser. This data can be used to track the habits of the user.

The dispenser is also provided with a transceiver 225 and/or a USB port 226 connected to controller 220. This allows communication with the dispenser remotely or directly. In this manner, any information stored in memory 215 can be downloaded so as to track dispensing times and compliance. These connections can also be used to program the controller when needed, such as when upgrading its software.

Dispenser 100 is provided with a detecting sensor 260 to determine whether a pill is in a slot aligned with the dispensing orifice. In a preferred embodiment, the detecting sensor 260 is in the form of an infrared emitter and receiver. Infrared emitter 262 is provided on or within axial mounting shaft 214, which is disposed at the center of hub 303 of dispensing cartridge 300 while mounted. Infrared receiver 264 is provided on a wall of recess 202 of main housing 200. If unobstructed, an infrared beam 263 emitted from emitter 262 is received by receiver 264. Receiver 264 sends a signal to controller 220 when that signal is received. Controller 220 is programmed, under most circumstances, to indicate that no pill is in a slot aligned with the dispensing orifice if the infrared beam is received. If a pill is in that aligned slot, the beam will be interrupted and receiver 264 will no longer send a signal to controller 220. Controller 220 would then indicate that that particular slot is filled. Dispensing cartridge 300 is designed to allow passage of the infrared beam therethrough when a slot is aligned with dispensing orifice 320. In this regard, center hub 303 has slots or transparent sections 303-1 to allow the IR beam 263 to pass. Further, the carousel inner wall 310 is provided with cut outs 311 and carousel outer wall 312 is in the form of flared edges designed to retain the pills yet have an open end to allow passage of the infrared beam.

When dispensing cartridge 300 is mounted on main body 200, it is essential that it be precisely positioned in mounting recess 202. In this regard, the recess 202 and cartridge 300 can be designed with complementary physical features, such as protrusions and recesses, so as to allow mounting in only one orientation. Additionally, a switch 213 can be provided in recess 202 in order to sense that the cartridge has been mounted. Instead of a dedicated switch, the infrared detecting sensor 260 can be used for this sensing.

When a cartridge is filled with pills P, but is not mounted on the main body, the carousel 306 may be free to rotate relative to upper and lower plates 302, 304, potentially allowing a pill P to be aligned with the dispensing orifice 320 and inadvertently dispensed. In order to prevent such a situation, an initial slot is not filled when the cartridge is pre-filled with pills. A solid stop (not shown) of a shape complementary to the recess can then be inserted in that empty slot to take up the space where a pill would fit. This stop engages both the empty slot of the carousel and edges of upper plate 302 that define dispensing orifice 320, precluding movement between the carousel 306 and plate 302. The stop can be removed after mounting the cartridge on the main body to allow the dispensing operation. The stop can be provided with tamper-resistant features. Alternatively, a removable adhesive tape can be used over the empty slot to prevent the relative movement.

Cartridge 300 can also be provided with a memory 350 for storing data. In one example, the memory can be an EEPROM. The stored data can include the type of medication, the date of filling, prescription identification and other data. Further, information can be written in EEPROM from the controller 220 of the main body 200 through a cartridge connection having an EEPROM reader/writer 408. For example, dispensing times can be recorded from controller 220 onto the cartridge EEPROM.

In order to position the cartridge at the home position upon mounting, a flag (not shown) can be provided on the carousel at the inner peripheral wall 310. Controller 220 can rotate the carousel until the flag is sensed by IR sensor 260. The carousel is then reverse rotated a preset number of degrees to the home position.

Dispenser 100 can be provided with any known biometric features to allow only a preauthorized user to actuate the dispenser. For example, actuator button 240 can be provided with a fingerprint reader that allows only the assigned user's finger to actuate the dispenser. The biometric information for comparison with the read information can be stored in memory 215.

An alert device will be provided in the pill dispenser 100 in order to alert a user of the time to take the medication or of errors in the system. The alert device may be an audio alarm, a visual alarm, a vibration alarm, or any combination thereof. The visual alarm may be the light emitting devices (LEDs) 204 or LCD display 205 shown in FIG. 1. For example, one of the LEDs glows green when the user is to take a pill and another glows red when it is not yet time for the user to take a pill. The audio alarm will emit an audible signal through speaker 206 when it is time for a user to take a pill and the vibrating alarm (not shown) will vibrate the pill dispenser 100 when it is time for the user to take a pill.

The visual alarm may be a flashing light or may be a steady light. Further, the audio alarm may emit sound in a pattern, may emit a steady sound or may be an automated voice. Further, the pill dispenser 100 is not limited to a single type of alert device. The pill dispenser 100 may contain all three types of alarms, any combination of the three types of alarms, or other alerting devices not discussed herein.

The alarms in the pill dispenser 100 are not only for alerting a user when to take medication, but can also alert the user if there is a system malfunction. For example, if the battery is getting too low or there is a mechanical malfunction, the dispenser 100 could emit an audio alarm with a sound that differs from the audio alarm sound used to indicate it is time to take medication. Also, the dispenser 100 could emit a different color LED 204 if there is a system malfunction.

The LEDs 204 may also be used to alert the user to what type of medication is in the pill dispenser. As an example, if a user is taking a variety of pills, a pill dispenser 100 for heart medication could glow red, and a pill dispenser 100 for diabetes medication could glow blue. As an alternative or in addition, dispensing cartridge 300 made be colored to indicate the medication loaded therein.

The selection and pre-filling of the dispensing cartridge 300 will be discussed below.

Dispensing cartridges 300 can be pre-filled, for example, at a pharmacy by a pharmacist or other authorized personnel. Dispensing cartridges can be designed with several sizes of carousel slots to accommodate different sizes of pills. The pharmacist selects which type of pill is to be filled and selects an appropriately-sized dispensing cartridge 300. The memory of the dispensing cartridge 300 can be connected to a pharmacy computer system either by wired or wireless means. The pharmacy computer system contains a database of all drug specifications. The pharmacy computer system enters the drug type, dose, dispensing time and other critical information to the memory of the dispensing cartridge 300. The pharmacy computer system also transmits the patient specific information, along with health care provider and pharmacy information, as required by relevant regulations.

Once the patient information and the specific drug information are uploaded to the dispensing cartridge 300, the dispensing cartridge can be filled. One of upper and lower panels 302, 304 can be removed to expose all of the carousel slots for batch filling, or the carousel can be filled through the dispensing orifice while turning the carousel a sufficient angle to expose the next slot. After filling is completed, the dispensing cartridge 300 is reassembled and the dispensing orifice is sealed with the removable film or plug. The film or plug can include tamper-resistant features known in the art. The pre-filling process can also be performed by an automated, suitably designed filling machine.

The pill dispenser 100 can be programmed to go into one of two modes:

1. A patient can decide when to take the first pill to begin initiation of a medication cycle, such as once every 24 hours, or three times a day, such as for antibiotics.

2. The pill dispenser 100 will have a suggested time for consumption saved in the database depending on the type of drug prescribed and will initiate an alarm at an appropriate window (such as in the morning).

The operation of the pill dispenser 100 by a user will be discussed below.

When a user wishes to dispense a pill, the user will press the button 240 located on the top face of main body 202. The control section 220 will begin a dispensing operation by sending an actuating signal to rotary motor 232. Motor 232 rotates transmission gears 233, 234, which engage with carousel gear 316 to rotate carousel 306 relative to upper plate 302. If the rotary motor is a stepper motor, the carousel is driven a precise angle by a predetermined number of steps so as to align the next filled carousel slot with the dispensing orifice. At this time, the pill in the aligned carousel slot will interrupt the IR beam from sensor 260, notifying the control section that the next pill is ready for dispensing. If a less accurate motor is used, the interruption of the IR beam, or other suitable feedback, can be used by controller 220 to signal the motor to stop actuating. When the next pill is aligned with the dispensing orifice, the main housing can then be tipped by the user to allow the pill to fall from the dispensing orifice into the user's hand, for example. After the pill has dropped from the dispensing orifice, the IR beam will no longer be interrupted, thereby allowing the IR beam to hit receiver. The resulting signal from the receiver is used by controller 220 to identify that the pill has been dispensed. The timing of dispensing can be recorded in the dispenser memory 215 and/or cartridge memory 350.

If at any stage in dispensing the pill the pill dispenser 100 determines there is an error, either due to the pill or the system, an alarm can be activated to alert a user.

The pill dispenser 100 keeps a timestamp of every type of event in a memory (not shown) of the controller. Events can include, for example, a successful dispensing at correct dosage and time; dispensing of incorrect dosage (i.e., an extra pill); successful dispensing at an incorrect time; and unsuccessful dispensing.

The pill dispenser 100 utilizes transceiver 225 to send and receive communications regarding user, prescription, and compliance information. The transceiver may be Zigbee and/or Bluetooth technology, a cell modem, a RFID transmitter, or any other known device for sending and receiving information. Preferably, the pill dispenser 100 contains more than one transceiver 225 for redundancy. For example, the pill dispenser preferably contains a cell modem and Bluetooth and/or Zigbee technology.

The cell modem will allow the controller 220 to send messages, via SMS text messages or any other suitable protocol such as TCP/IP, to a central server so as to report compliance data of a user, any malfunctions, or any misuse of the pills that is sensed by the pill dispenser 100. The Bluetooth or Zigbee technology allows for the device to be able to quickly interact with the pharmacy computing system. The pharmacy computer will detect the pill dispenser 100 and its unique ID and will download any necessary data to the pill dispenser 100.

Information from the cell modem may also be used by an external server to send messages to any outside source, for example, a user's family or friends, a caretaker, doctor, other healthcare provider, a researcher, pharmaceutical company, a pharmacy for refills, etc., as needed or desired.

When dispensing cartridge 300 is removed from dispenser 100 and returned to the pharmacy after use, the data recorded by the dispensing cartridge 300, including data that had already been sent to a central server, may be uploaded to a pharmacy computer. The pharmacy database then may compile the data received from the dispensing cartridge 300 into a report to send to a doctor and/or a central database. The data compiled may include the information discussed above and also when the dispensing cartridge 300 was returned to the pharmacy.

The dispensing cartridge 300 may then be reset and refilled for a new user or a new prescription.

While the pill dispenser 100 has been described as having a battery as power source 250, the pill dispenser 100 is not limited to a battery for power supply, but rather any power source may be used to power the pill dispenser 100.

Figure 7:
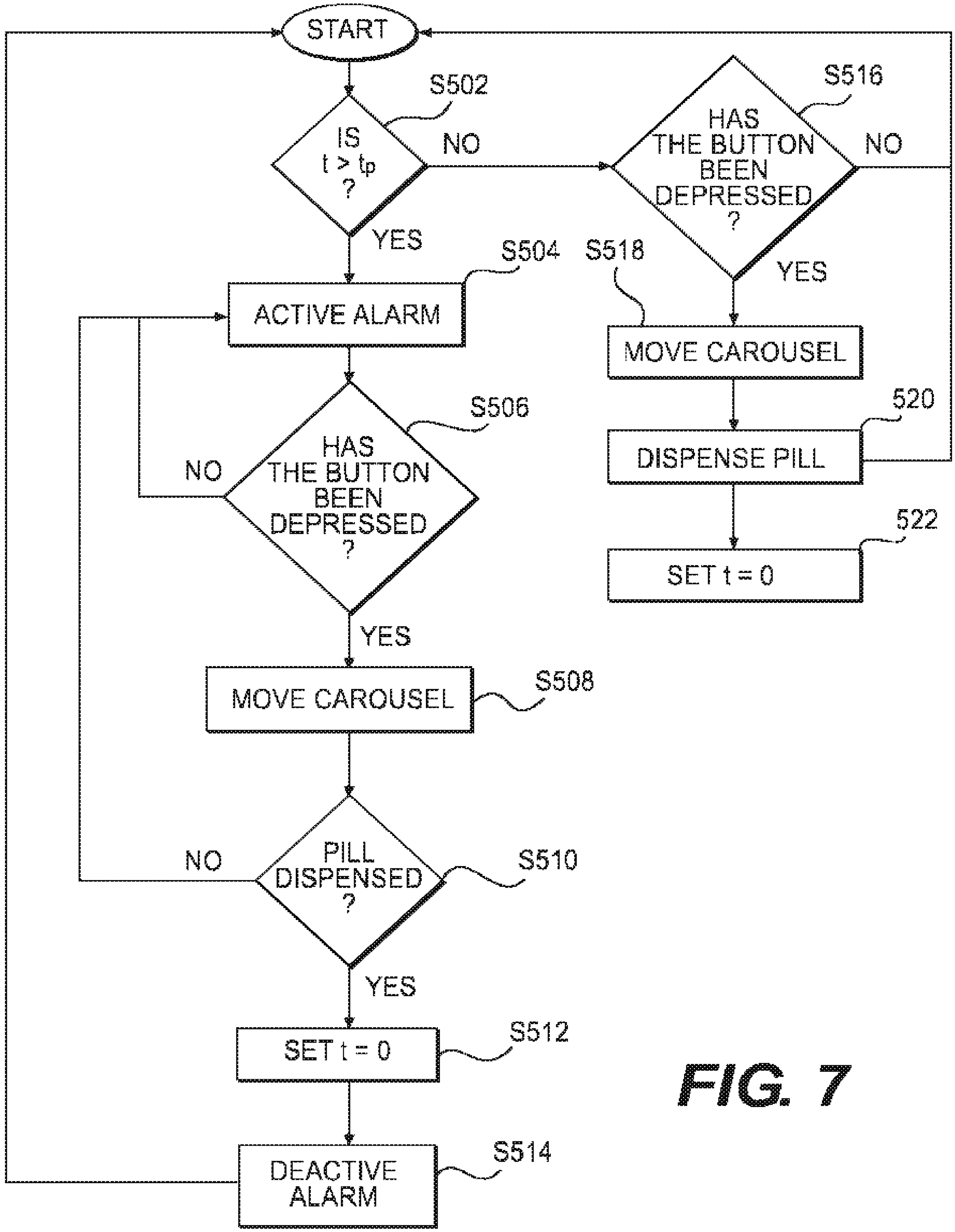
FIG. 7 is a flow chart of a method of operating the dispenser of the present invention.

A process for determining when to indicate to a user it is time to take a pill is shown in FIG. 7. At step S502, the controller 220 determines if time has elapsed for the next dose of the medication as prescribed by the information stored in the memory 350 of dispensing cartridge 300 and/or memory 215 of main housing 200. More specifically, controller 220 determines if the elapsed time t is greater than a prescribed time interval $t_p$. If yes, the controller 220 activates an alert in step S504. Here, activating the alert means indicating to the user that it is time to take a pill. Deactivating the alert, mentioned below, signals to the user it is not yet time to take the pill. For ease of example, only a visual alarm will be described. If the prescribed time has elapsed, the alarm will flash a green light indicating to the user it is time to take a pill. If the prescribed time has not yet elapsed, the alarm will continue to flash a red light indicating to the user it is not yet time to take the next dose.

In step S506, when the alarm indicates to the user it is time to take the next dose, the user may press the button 240 to dispense a pill. If the user has depressed the button 240, then in step S508 the controller 220 controls motor 232 to rotate carousel 306 to align the slot holding the next pill to be dispensed with dispensing orifice 320, as discussed above. The controller 220 determines that the next pill has been moved into alignment with the dispensing orifice 320 when the signal from sensor 260 indicates that the IR beam has been interrupted.

In step S510, the controller 220 determines if the aligned pill has been removed from its carousel slot by determining whether the signal from sensor 260 indicates that the IR beam is once again received by sensor receiver 264. If no, the processing unit 402 will return to step S504 and the alarm on the pill dispenser 100 will continue to alert the user that it is time to take a pill. If the pill has been dispensed, i.e., removed from its carousel slot, in step S512 the controller 220 will set the elapsed time t=0. In step S514, the alarm will be deactivated and the controller 220 will again begin monitoring the elapsed time t to determine if it is time for the user to take another pill based on the dose specifications stored in the memory.

If the elapsed time t is not greater than the prescribed time interval in step S502, the controller 220 will continuously monitor whether the button 240 has been depressed in step S516. If not, the controller 220 will continue to monitor the time. If the button has been depressed in step S516, the controller controls to align the pill in the next carousel slot with the dispensing orifice in step S518, and monitors when the pill has been dispensed, i.e., removed from its carousel slot, in step S520. Once dispensed, the elapsed time t will be set to zero in step S522.

As discussed above in FIG. 7, if a user depresses the button 240 before the timer in the controller 220 has determined that it is time for the user to take the pill, the pill dispenser 100 may still dispense a pill and restart the timer when the pill is dispensed to begin a new calculation of a new time for the next dose. The controller 220 will store the date and time the user dispenses the pill. Further, the pill dispenser 100 may send a message to an outside service if certain conditions are met, such as a predetermined number of pills are taken before the prescribed interval has elapsed, the unit has been tampered with, there is a malfunction in the pill dispenser 100, or the prescribed number of pills has been dispensed. All of the various information is stored in the memory of the controller 220 and/or dispensing cartridge.

Figure 8:
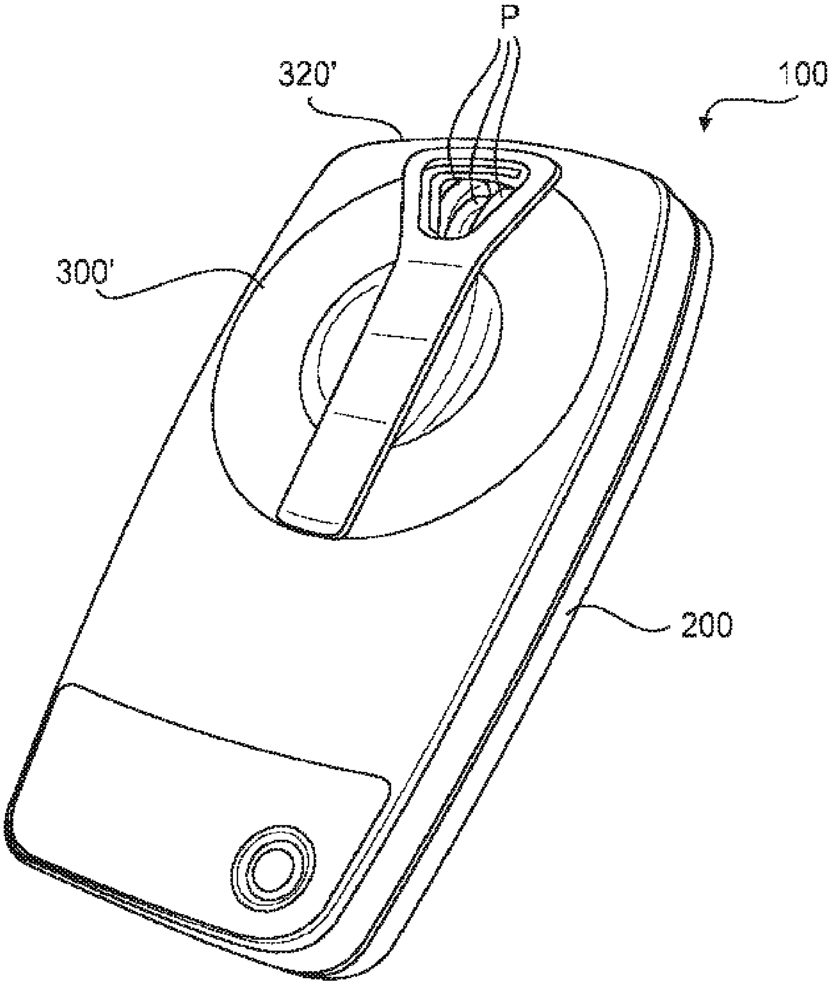
FIG. 8 is a perspective view of a dispenser of a second embodiment of the present invention.

The foregoing embodiment describes a dispenser 100 that can dispense one pill at a time. The invention, however, is not limited to single pill dispensing. Plural pills can be dispensed with each actuation by modifying the slots in the carousel. For example, as shown in FIG. 8, three pills are provided in one slot of modified dispenser cartridge 300'. Main housing 200 of dispenser 100 need not be physically modified, but must be programmed to actuate the rotation of the cartridge by an increased angle. Such modified programming can be prestored in memory 215 and loaded when reader 408 reads the EEPROM of the mounted cartridge 300', identifying it as a three-pill dispenser. Any number of programs can be preloaded in main body memory 215 to accommodate any of various configurations of cartridges. Alternatively, the programming of the dispenser can be modified on an as-needed basis through its wired or wireless connections, either remotely or proximally.

In order to modify cartridge 300' to dispense plural pills, the carousel slots and dispensing orifice 320' are modified. The sizes of the slots are increased to accommodate a greater number of pills. The distance between adjacent separating walls 314 (not shown in FIG. 8) of the carousel can be increased to accommodate additional pills. The shape of the separating walls preferably remains contoured to conform to the shapes of the pills in contact therewith. The geometry of the pills can be utilized in conjunction with the shape of the slots to ensure that each of the pills is maintained in its desired orientation until dispensed. For example, as shown in FIG. 8, the geometries of the pills and the carousel slot are designed so as to maintain the pills on their flat sides until dispensed. As an alternative, additional separating walls or other elements can be used to individually maintain each of the pills in its desired orientation.

As discussed with regard to the first embodiment, maintaining the pills in the desired orientation is important in blocking the IR beam 263 used by sensor 260. In this multi-pill embodiment, the IR beam can be directed at one of the pills in each slot when aligned, and all of the pills in a given slot can be assumed to be moved to the dispensing position and dispensed based on the signal from the sensor 260. Alternatively, the IR beam can be split by any known means and directed at each of the pills in an aligned slot. In this modification, IR receiver 264 would also have to be modified to receive and discriminate the plural beams.

A third embodiment of a dispenser system according to the present invention is shown in FIGS. 9-13. Dispenser (an article containing assembly) 500, as in the first and second embodiments, includes a main body or housing (a complementary member) 600 and a dispensing cartridge (an article containing member) 700. Some respects in which the third embodiment differs from the first and second embodiments are that dispensing cartridge 700 does not include a lower panel, but rather includes a carousel 720 rotatably secured to a stationary upper panel or casing 710, the dispensing cartridge 700 is provided with locking mechanisms to prevent movement of the carousel relative to the stationary casing when the cartridge is not mounted on main housing 600, dispensing cartridge 700 is provided with its own processor that can physically engage with communication lines on the main body, and the dispensing cartridge includes a detector that can determine whether the cartridge has been or is being disassembled. Each of these features will be discussed in more detail below.

Figure 9:
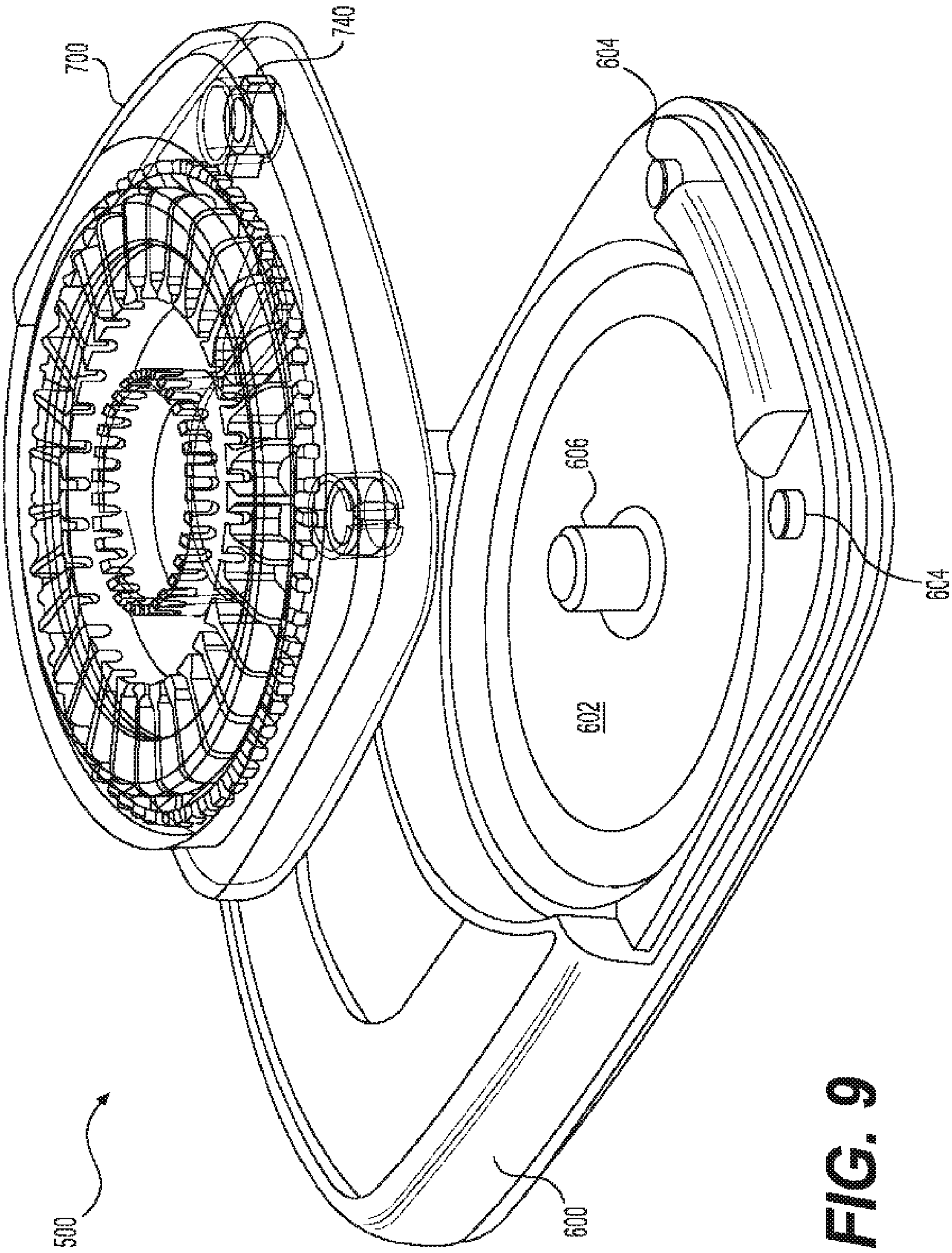
FIG. 9 is a perspective view of a dispenser of a third embodiment of the present invention.

As shown in FIG. 9, the third embodiment of the present invention is directed to a dispenser 500 that includes main body or housing (complementary member) 600 and dispensing cartridge (article containing member) 700. As in the previous embodiments, dispensing cartridge 700 can be filled with articles, such as medicinal pills, and mounted on the main housing so as to allow the articles to be dispensed from the cartridge upon actuation. Main body 600 includes a controller, actuator mechanism, actuator switch or button, power source, and pill sensing device or sensors similar to those in the previous embodiments and such will not be discussed in further detail. One difference from the prior embodiments is that dispensing cartridge 700 does not include a gear to be engaged by a drive gear of the main housing. Rather, main housing 600 is provided with a geared, rotatable platform 602 (the peripheral gear teeth are not shown in the Figure) that can engage with the drive gear 235 in the main housing. The carousel in the dispensing cartridge 700 is driven by its bottom surface contacting geared platform 602 and rotating when the geared platform rotates by frictional contact.

Dispensing cartridge (article containing member) 700 includes stationary (upper) casing 710 with a dispensing face 712 provided on its upper surface and having dispensing orifice 714, carousel 720, connection nut or connector 750, locking mechanisms or stoppers 740, biasing springs 746, and processor or PCB 760. Carousel 720 is secured to upper casing 710 using locking nut 750. Carousel 720 is provided with a plurality of radial slots 722 for receiving the pills. Slots 722 are defined by inner peripheral wall 724, outer peripheral wall 726 and a series of radial separating walls 728. As in the first and second embodiments, the separating walls 728 can have symmetrical and contoured shapes to approximate the shape of the pills and allow little play of the pills when held in the slots.

Carousel 720 is configured with an annular size and shape so as to fit within article recess 716 of upper casing 710 with a central projecting hub 734 closely fitting around central receiving hub 717 of casing 710. Central receiving hub 717 provides a center of rotation for the carousel.

Casing 710 is provided with recesses that act as stopper guides 718 for receiving stoppers 740. Preferably two or more stoppers and corresponding guides are provided for a cartridge (article containing member) 700. Each stopper 740 includes a preferably cylindrical main body 742 and stopper projections **744*a*, 744*b* extending therefrom in radially opposite directions. The projections 744*a*, 744*b* are fitted into vertical slots 719 in the stopper guides 718, which are configured such that the stoppers 740 can move vertically up or down, but cannot rotate. Each stopper 740 is provided with biasing spring 746 to bias it from an upper position towards a lower position within corresponding stopper guide 718. Each biasing spring 746 engages a top surface of corresponding stopper 740 at one end, and presses against and internal upper surface of stopper guide 718 on its opposite end. Unless engaged with an external force, stoppers 740** are thereby biased in the lower position.

The internal projection **744*a* of each stopper 740 is designed to engage with teeth 730 provided on the outer periphery of carousel 720. That is, when cartridge 700 is assembled and stoppers 740 are in the lower positions, inner projections 744*a* are positioned in gaps 732 between the teeth of the carousel. Because stoppers 740 cannot rotate due to the engagement of their projections 744*a*, 744*b* with slots 719 of stopper guides 718, carousel 720** cannot rotate when engaged with the stoppers.

Main body 600 is provided with projections 604 for engaging stoppers 740. When the cartridge 700 is mounted on the main body 600, projections 604 are urged against the bottom surfaces of stoppers 740 so as to force the stoppers upward against the biasing force of springs 746. When raised sufficiently, projections 744*a* are disengaged from teeth 730 so as to no longer prevent rotation of the carousel. At this time, however, carousel 720 will not rotate due to the friction between the bottom of the carousel and platform 602. When platform 602 is driven to rotate, the carousel is driven and rotated along with it.

Cartridge 700 can also be designed so that when the cartridge is not mounted on the main body 600, stoppers 740 can be moved from the biased lower position to the upper position using a user's fingers or a specialized tool. However, by providing two or more stoppers, the stoppers would have to be manipulated simultaneously in order to completely release engagement. This will aid in preventing unintended or inadvertent release of the carousel.

Assembly of cartridge 700 will be described below. As noted above, carousel 720 is received within upper casing 710 such that its central projecting hub 734 is received within central receiving hub 717, and the article slots 722 define by raised separating walls 728 are received within article recess 716 of upper casing 710. In this regard, the undersurface of article recess 716 acts as an upper surface of slots 722 to hold the articles within the slots. Thus, an article can only be removed from a slot when that slot is aligned with dispensing orifice 714. In a preferred embodiment, upper casing 710 is made of a translucent material so that all of the articles in the slots 722 can be seen.

Figure 10:
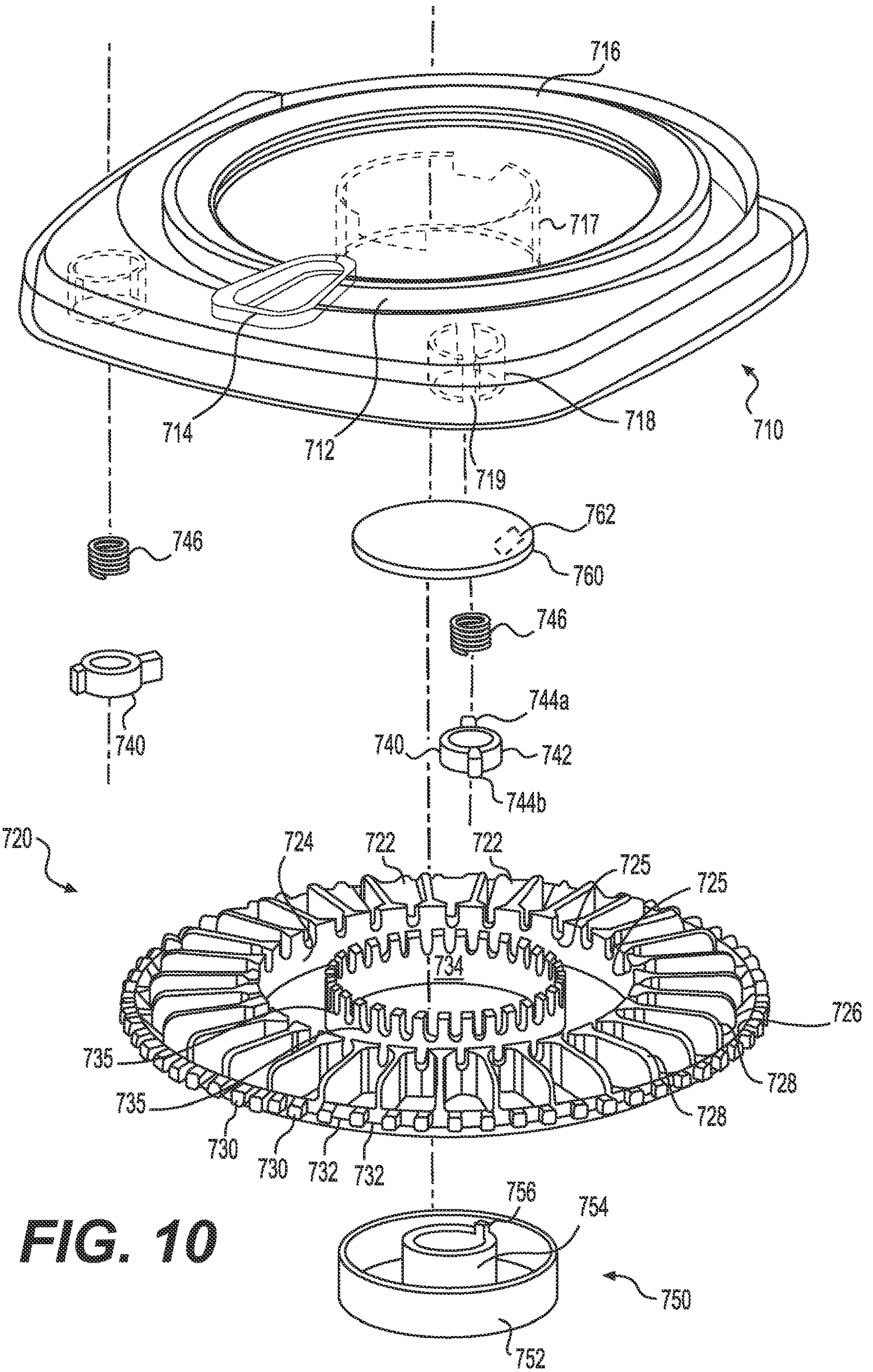
FIG. 10 is an exploded perspective view of a cartridge used with the dispenser of the third embodiment of the present invention.
Figure 11:
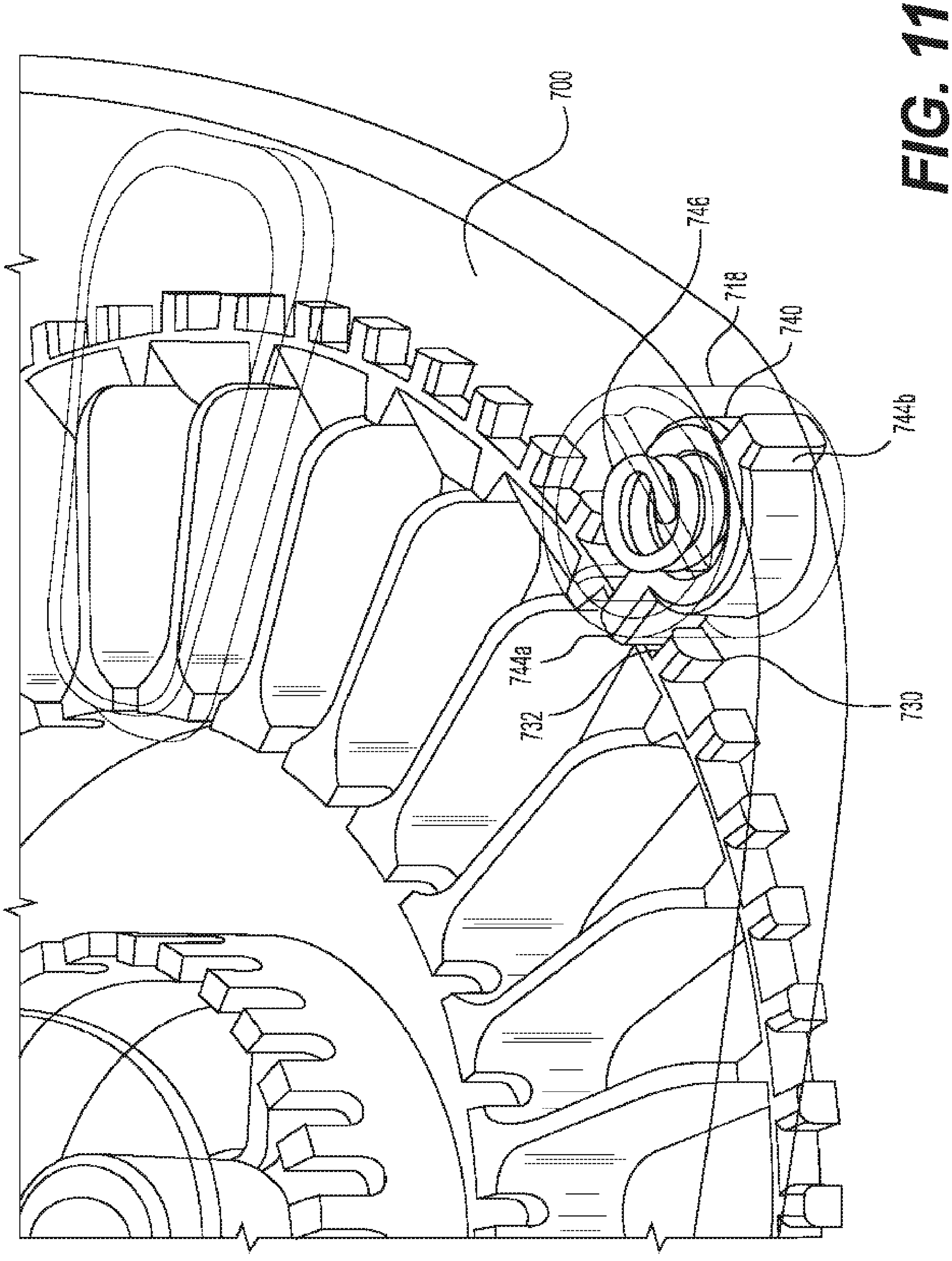
FIG. 11 is an enlarged perspective view of a portion of the mounted cartridge of the third embodiment of the present invention in the locked position.
Figure 12:
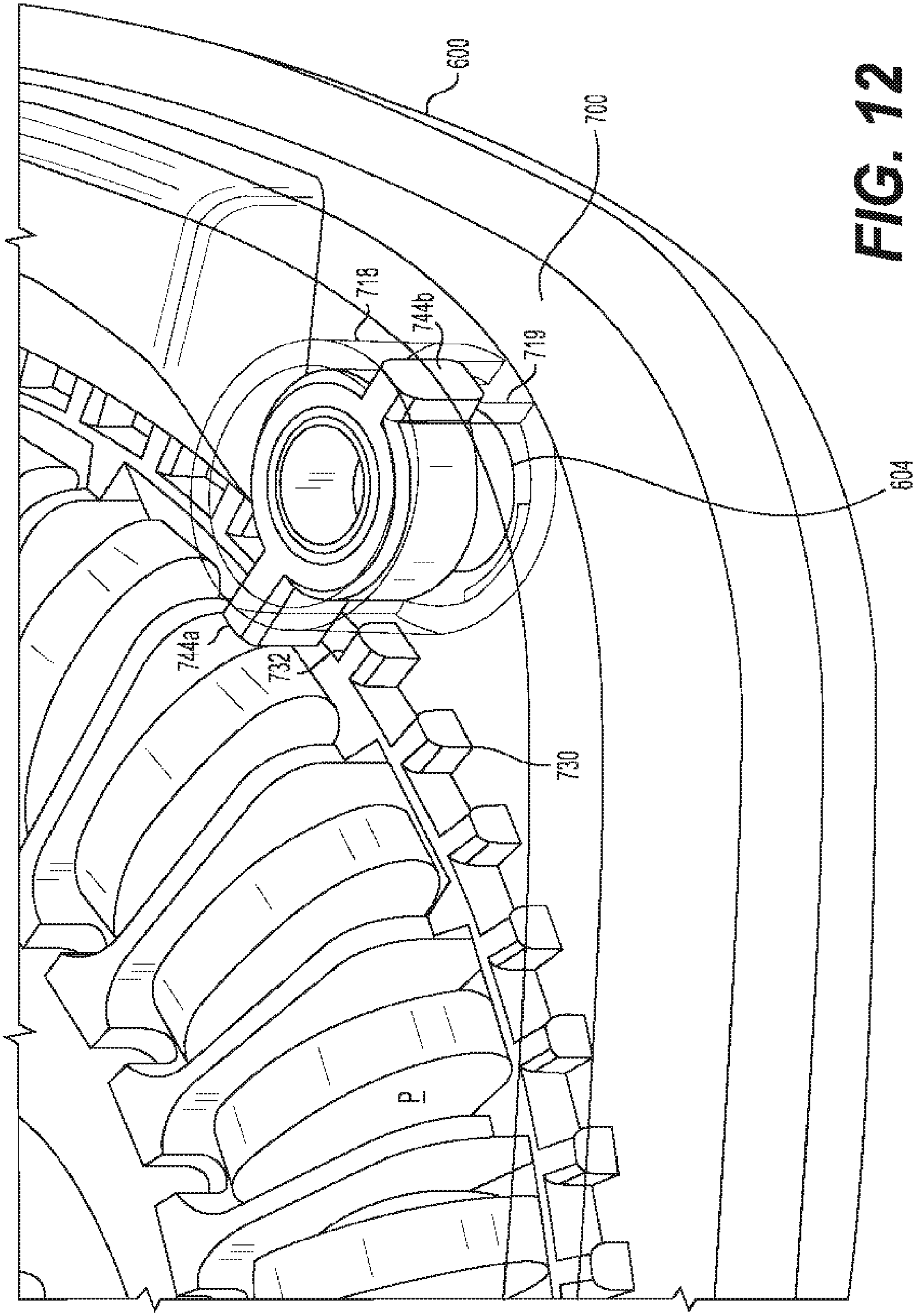
FIG. 12 is an enlarged perspective view of a portion of the unmounted cartridge of the third embodiment of the present invention in the unlocked position.

Before carousel 720 is inserted into upper casing 710, stoppers 740 and stopper springs 746 are inserted in the recesses of stopper guides 718. Further, processor or PCB 760 in the shape of a disk sized to the inner periphery of central receiving hub 717 of upper casing 710 is inserted therein. Processor 760 can be secured between projecting hub 734 of carousel 720 and receiving hub 717 of upper casing 710. After the foregoing components, as shown in FIG. 10, are assembled, connector 750 is inserted to engage a connection lip 736 of carousel 720, and connects with a connection portion of receiving hub 717 of upper casing 710. Thus, connector 750 and upper casing 710 sandwich carousel 720 therebetween. The connection between connector 750 and upper casing 710 can be of any known type, such as a connection where tabs interlock with recesses upon rotation like a bayonet connection. Connector 750 is of an annular shape that includes a cylindrical outer periphery 752 and an inner spindle hub 754. Connector 750 further includes a sensor projection (a contact member) 756. Sensor projection 756 is designed to depress (i.e., by physical contact) a switch 762 on processor 760 when cartridge 700 is fully assembled. The switch 762 on processor 760 can be considered a sensor section within the processor, and the sensor section of the processor and the sensor projection 756 together can function as a sensor for detecting disassembly. If the cartridge is disassembled, sensor projection 756 will disengage from (i.e., no longer be in physical contact with) the sensor section (switch 762) of processor 760. The processor can then determine that the cartridge has been disassembled. This information can be stored in the processor 760 or disseminated to appropriate healthcare personnel as desired.

Figure 13:
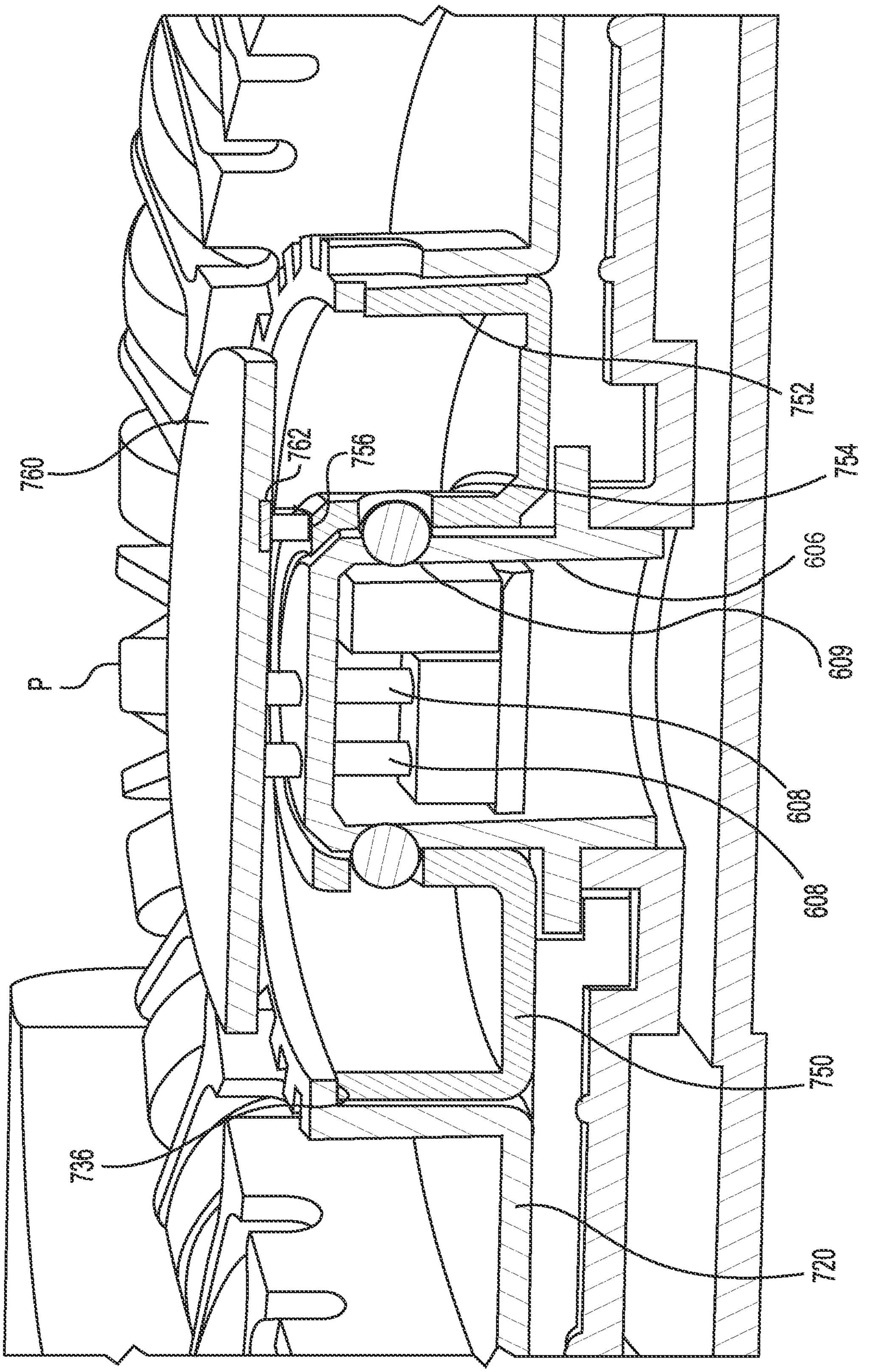
FIG. 13 is an enlarged sectional view of a portion of the mounted cartridge of the third embodiment of the present invention.

Main body 600 is provided with a stationary spindle or hub 606 at the center of platform 602. Spindle 606 is provided with a locking mechanism 609 to engage the spindle hub 754 of connector 750. For example, the locking mechanism can be spring-loaded ball bearings that engage recesses of the spindle hub, as shown in FIG. 13. The force exerted by the locking mechanism in the vertical direction is greater than the combined force exerted by the stopper springs 746, so that the force of the stopper springs will not overcome the spindle connection force and inadvertently disengage the connection between cartridge 700 and main body 600.

Spindle 606 is also provided with contact pins 608 that contact corresponding contacts on cartridge processor 760 when the cartridge is mounted on the main body. As shown in FIG. 13, contact pins 608 can be supported by a biasing body to provide sufficient force for electrical connection. Contact pins allow transmission of signals between cartridge processor 760 and main processor 220 in main body 600. Contact pins 608 can also allow electrical supply from the main body to cartridge processor 760. In addition, article sensor 260 is provided in spindle 606, in the manner described in the previous embodiments. In order to allow IR beams to pass from unshown emitter 262 to receiver 264, projection hub 734 of carousel 720 is provided with openings 735 and its inner wall 724 is provided with openings 725. Receiving hub 717 is provided with corresponding openings (not shown) or allows the beams to pass by way of its translucence.

After the cartridge 700 of the third embodiment is mounted on the main body 600, stoppers 740 will be moved in the vertical direction to disengage from slots 722 and allow carousel 720 to be operated in the same manner as the previous embodiments. If desired, sensors can be provided for stopper 740 to sense whether the stoppers are in the lower, locked position or upper, unlocked position.

Cartridge processor 760 can include a memory and can interface with the main processor 220 or another host processor, such as a computer at a pharmacy. Processor 760 can include sensors, such as environmental sensors, and a clock to sense and store dates, times and durations of ambient conditions such as temperature and humidity. Processor 760 can also record dates and times of cartridge loading and dispensing and cartridge assembly and disassembly. The interface can be a direct or remote connection. The cartridge processor 760 can be powered by a battery that can be charged from main body 600 or a separate charger.

Thus, there has been shown and described new and useful devices for dispensing articles, such as pills, to a user and determining if the user complies with the prescribed method of consumption. Although this invention has been exemplified for purposes of illustration and description by reference to certain specific embodiments, it will be apparent to those skilled in the art that various modifications, alterations, and equivalents of the illustrated examples are possible.

What is claimed is:

1. An article containing assembly, comprising:

an article containing member having a region for containing one or more articles;

a complementary member being removably attached to the article containing member;

a processor including a sensor section for detecting whether the article containing member is secured to the complementary member, the sensor section being disposed within the processor; and a contact member for engaging with the sensor section when the article containing member is secured to the complementary member and disengaging with the sensor section when the article containing member is not secured to the complementary member, wherein when the article containing member is secured to the complementary member, the contact member physically contacts the sensor section of the processor, and when the article containing member is not secured to the complementary member, the contact member is physically out of contact with the sensor section of the processor.

2. The article containing assembly according to claim 1, wherein the sensor section comprises a switch that breaks contact with the contact member when a distance between the article containing member and the complementary member is more than a predetermined distance.

3. The article containing assembly according to claim 1, wherein when the contact member contacts the sensor section of the processor, the processor determines that the complementary member is secured to the article containing member and not detached.

4. The article containing assembly according to claim 1, further comprising a memory for storing data.

5. The article containing assembly according to claim 1, further comprising an environmental sensor for detecting at least one of temperature and humidity.

6. The article containing assembly according to claim 1, further comprising a transceiver for sending and/or receiving information.

7. The article containing assembly according to claim 1, further comprising an alert device for alerting a user of the article containing assembly.

8. An article containing assembly, comprising:

an article containing member having a region for containing one or more articles;

a complementary member being removably attached to the article containing member;

a processor including a sensor section for detecting whether the article containing member is secured to the complementary member, the sensor section being disposed within the processor; and a contact member for engaging with the sensor section when the article containing member is secured to the complementary member and disengaging with the sensor section when the article containing member is not secured to the complementary member, wherein the sensor section is provided in one of the article containing member and the complementary member and the contact member is provided in the other of the article containing member and the complementary member, when the article containing member is secured to the complementary member, the contact member physically contacts the sensor section of the processor, and when the article containing member is not secured to the complementary member, the contact member is physically out of contact with the sensor section of the processor.

9. The article containing assembly according to claim 8, wherein the sensor section comprises a switch that breaks contact with the contact member when a distance between the article containing member and the complementary member is more than a predetermined distance.

10. The article containing assembly according to claim 8, wherein when the contact member contacts the sensor section of the processor, the processor determines that the complementary member is secured to the article containing member and not detached.

11. The article containing assembly according to claim 8, further comprising a memory for storing data.

12. The article containing assembly according to claim 8, further comprising an environmental sensor for detecting at least one of temperature and humidity.

13. The article containing assembly according to claim 8, further comprising a transceiver for sending and/or receiving information.

14. The article containing assembly according to claim 8, further comprising an alert device for alerting a user of the article containing assembly.

15. A complementary member usable with an article containing member having a region for containing one or more articles, the complementary member comprising:

a processor including a sensor section for detecting whether the article containing member is secured to the complementary member, the sensor section being disposed within the processor; and a contact member for engaging with the sensor section when the article containing member is secured to the complementary member and disengaging with the sensor section when the article containing member is not secured to the complementary member, wherein when the article containing member is secured to the complementary member, the contact member physically contacts the sensor section of the processor, and when the article containing member is not secured to the complementary member, the contact member is physically out of contact with the sensor section of the processor.

16. The complementary member according to claim 15, wherein the sensor section comprises a switch that breaks contact with the contact member when a distance between the article containing member and the complementary member is more than a predetermined distance.

17. The complementary member according to claim 15, wherein when the contact member contacts the sensor section of the processor, the processor determines that the complementary member is secured to the article containing member and not detached.

18. The complementary member according to claim 15, further comprising a memory for storing data.

19. The complementary member according to claim 15, further comprising an environmental sensor for detecting at least one of temperature and humidity.

20. The complementary member according to claim 15, further comprising means for sending and/or receiving information.

* * * * *